United States Patent
Kramer

(10) Patent No.: US 11,414,114 B2
(45) Date of Patent: Aug. 16, 2022

(54) ELECTRIC UTILITY AND PLAY VEHICLE

(71) Applicant: Morf, LLC, West Hollywood, CA (US)

(72) Inventor: Eitan Kramer, Los Angeles, CA (US)

(73) Assignee: MORF, LLC, West Hollywood, CA (US)

( * ) Notice: Subject to any disclaimer, the term of this patent is extended or adjusted under 35 U.S.C. 154(b) by 1 day.

(21) Appl. No.: 16/870,865

(22) Filed: May 8, 2020

(65) Prior Publication Data

US 2020/0353963 A1 Nov. 12, 2020

Related U.S. Application Data

(60) Provisional application No. 62/845,246, filed on May 8, 2019.

(51) Int. Cl.
*B62B 3/00* (2006.01)
*B62B 5/00* (2006.01)

(52) U.S. Cl.
CPC .............. *B62B 3/007* (2013.01); *B62B 3/001* (2013.01); *B62B 5/0053* (2013.01)

(58) Field of Classification Search
CPC ........ B62B 3/001; B62B 3/007; B62B 5/0033
See application file for complete search history.

(56) References Cited

U.S. PATENT DOCUMENTS

| | | | | |
|---|---|---|---|---|
| 6,155,902 | A * | 12/2000 | Kole, Jr. ................. | B62B 3/001 280/87.01 |
| 6,308,792 | B1 * | 10/2001 | Garrett ................... | B62D 51/04 180/19.3 |
| 7,762,363 | B1 * | 7/2010 | Hirschfeld ........... | B60K 7/0007 180/65.1 |
| 8,069,939 | B1 * | 12/2011 | Metzler .................. | B62B 3/007 180/19.3 |
| 9,908,570 | B1 * | 3/2018 | Mayers .................. | B62B 5/067 |
| 9,925,999 | B2 * | 3/2018 | Young ................... | B62B 5/0073 |
| 10,583,852 | B2 * | 3/2020 | Fitzwater ............... | B62B 5/082 |
| 2010/0123294 | A1 * | 5/2010 | Ellington ................ | B62B 3/02 280/47.371 |
| 2018/0208227 | A1 * | 7/2018 | Young ................... | B62B 5/0073 |
| 2018/0237046 | A1 * | 8/2018 | Bovino .................. | B60L 50/60 |
| 2019/0144054 | A1 * | 5/2019 | Bliss .................... | B62D 55/065 280/5.22 |
| 2020/0031376 | A1 * | 1/2020 | Horowitz ............... | B62B 3/007 |
| 2020/0353963 | A1 * | 11/2020 | Kramer .................. | B62B 3/001 |

* cited by examiner

*Primary Examiner* — Jeffrey J Restifo
(74) *Attorney, Agent, or Firm* — Kilpatrick Townsend & Stockton LLP

(57) ABSTRACT

A wagon having both a utility mode and a driving mode is disclosed. The wagon includes a chassis and a bucket for conveying at least one object. The object can be an inanimate object, wherein the wagon can be configured in utility mode to be pulled by an operator. Or, the object can be a living being, wherein the wagon can be configured either for the utility mode or a driving mode to be driven and controlled by an occupant of the bucket. Various features enable the wagon to be reconfigurable for a desired design.

10 Claims, 4 Drawing Sheets

ELECTRIC UTILITY AND PLAY VEHICLE

CROSS-REFERENCE TO RELATED APPLICATIONS

The present application claims the benefit of U.S. Provisional Application No. 62/845,246, filed May 8, 2019, and entitled "ELECTRIC UTILITY AND PLAY VEHICLE", the entire contents of which are incorporated herein by reference.

BACKGROUND

A wagon is a vehicle for transporting people or objects, or other specific utilitarian purpose. Typically, a wagon has three or four wheels attached to a base or bed, which might also include a container formed of side walls to hold the people and/or objects. Most wagons include a handle or a hitch to allow it to be pulled by a person or an animal.

While sometimes including & removable side walls, most wagons are not customizable, either for different utilities and/or designs. Further, most wagons are not drivable by an occupant. Finally, while some modern wagons are adapted for traversing off-road, there is still some difficulty in pulling such modern wagons long distances or over rough terrain such as rocks or sand.

SUMMARY

This document describes an electric motor-assisted wagon that is customizable for any number of utilitarian tasks or for any number of design features.

In one aspect, a wagon configured to convey at least one object is described. The at least one object can be an inanimate object and/or a living being. The wagon has at least three wheels including one or more rear wheels and one or more front wheels. The wagon includes a chassis having a rear portion that supports the one or more rear wheels, and a front portion that supports the one or more front wheels, the chassis further including at least one bucket that is sized and configured to contain the at least one object. The wagon further includes a propulsion mechanism engaged with at least one of the one or more front wheels and/or one or more rear wheels.

The wagon further includes a steering mechanism connected with the front portion and/or rear portion of the chassis. The steering mechanism includes a steering column connected with the at least one of the one or more front wheels and/or one or more rear wheels to enable steering of the wagon, a handle connected with the steering column by a joint that enables a pivoting of the handle, and at least one handgrip at a distal end of the handle opposite the joint. The pivoting of the handle is enabled between a pulling mode of the wagon where the at least one handgrip extends forward from the steering column and front portion of the chassis, and a driving mode of the wagon where the at least one handgrip extends rearward from the steering column toward the at least one bucket of the chassis. The wagon further includes a drive actuator configured to actuate the propulsion mechanism to drive the at least one of the one or more front wheels and/or one or more rear wheels, the drive actuator being accessible at least from the at least one bucket in the driving mode.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes an electric motor-assisted wagon that is customizable for any number of uses and/or for any number of design features.

Figure 1:
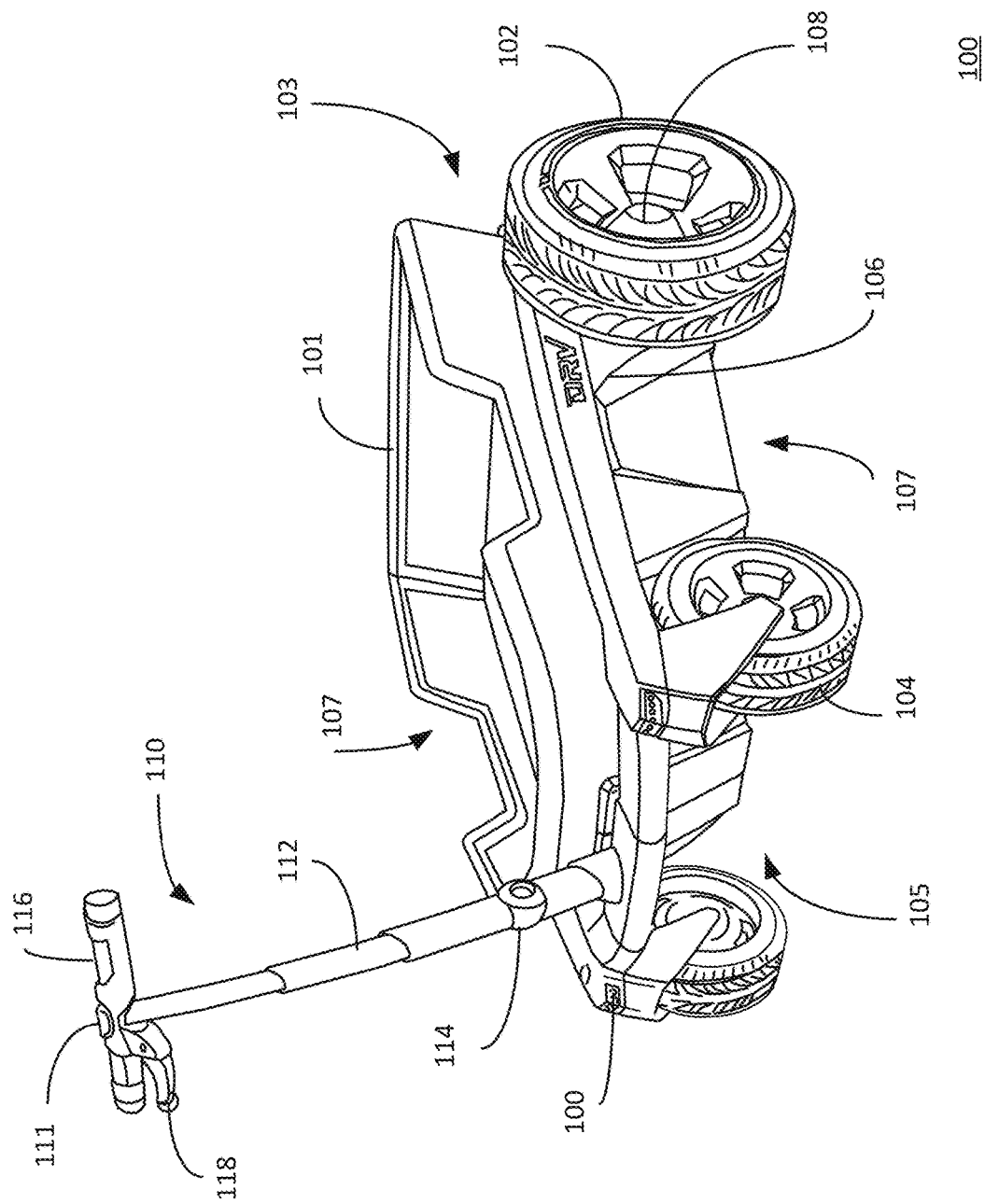
FIG. 1 illustrates a wagon in accordance with implementations described herein.

FIG. 1 is a perspective view of one implementation of a wagon 100 configured to convey at least one object, the at least one object being an inanimate object and/or a living being. The wagon 100 includes at least three wheels, which are comprised of one or more rear wheels 102 and one or more front wheels 104. The wagon 100 includes a chassis 106 having a rear portion 103 that supports the one or more rear wheels 102, a front portion 105 that supports the one or more front wheels 104, and opposing side portions 107. the chassis further including at least one bucket 101 that is sized and configured to contain the at least one object.

Figure 4:
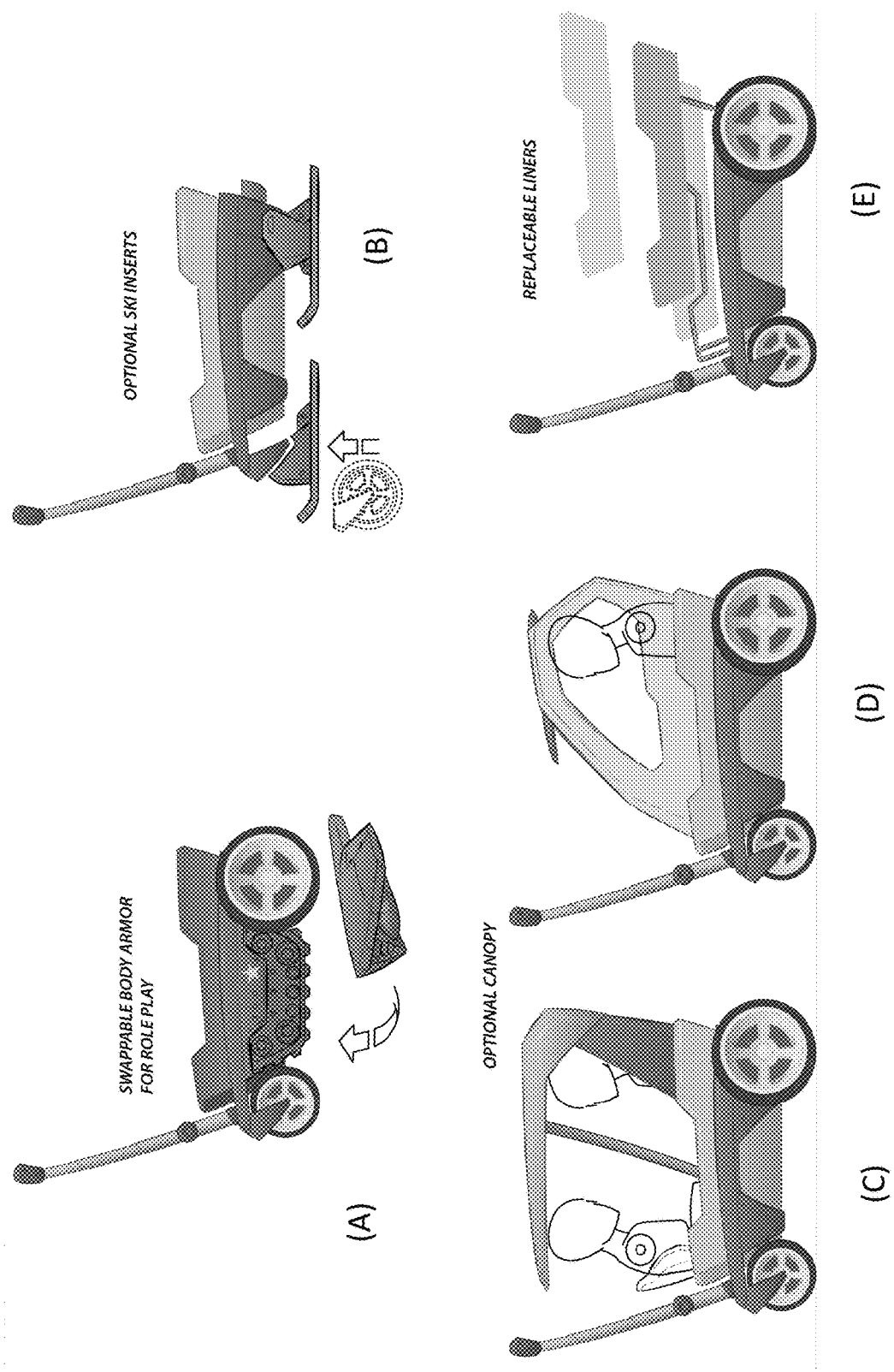
FIGS. 4A-4E depict additional features and designs for an electric utility and play wagon in accordance with implementations described herein.

The bucket 101 can include one or more compartments, seats, seat belts, or the like. The bucket 101 can be water-resistant, such as made of plastic or nylon, and provide buoyancy to the wagon 100. Alternatively, the bucket 101 can include one or more passageways, such as to provide, without limitation, protrusion of a rider's feet for propelling the wagon 100, or for extending the rider's arms or hands. The bucket 101 can include on or more doors that swing out sideways, or open out to lay flat. In some implementations, as shown below, the bucket 101 can include a roll bar, canopy, lid, tent, liner, or the like, and as shown in FIGS. 4C-4E.

In some implementations, the wagon 100 can further include a propulsion mechanism 108 engaged with at least one of the one or more front wheels and/or one or more rear wheels. The propulsion mechanism 108 can include an electric drive motor that is powered by a removable battery. Alternatively, the propulsion mechanism 108 can include a manual propulsion mechanism operable by the living being when the at least one object being conveyed by the wagon is the living being. In still other implementations, the propulsion mechanism 108 can include a passageway in the bottom of the chassis 106, to allow a rider to propel the wagon 100 with their feet or even hands. The propulsion mechanism 108 can further include a drive actuator 111 configured to actuate the propulsion mechanism to drive the at least one of the one or more front wheels and/or one or more rear wheels, the drive actuator being accessible at least from the at least one bucket in a driving mode, as explained further below, or by a handle in a pulling mode, also as explained further below. The drive actuator can include one or more of a pedal, a button, a switch, a stick shift, a handgrip, a clutch, or any other type of user-accessible actuator.

Figures 2A, 2B, 2C:
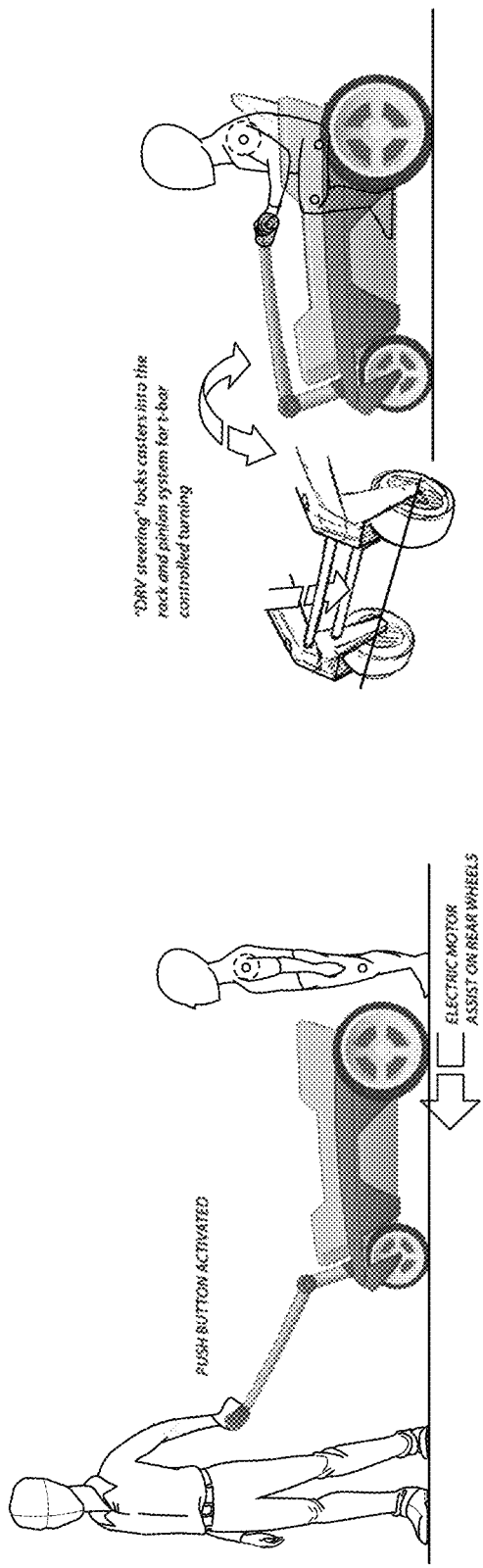
FIGS. 2A-2C depict certain features of an electric utility and play wagon in accordance with implementations described herein.

The wagon 100 further includes a steering mechanism 110 connected with the front portion 105 and/or rear portion 103 of the chassis 106. The steering mechanism 110 can include a steering column connected with the at least one of the one or more front wheels 104 and/or one or more rear wheels 102 to enable steering of the wagon 100. The steering mechanism 100 can further include a handle 112 connected with the steering column by a joint 114 that enables a pivoting of the handle 112. The steering mechanism 110 can further include at least one handgrip 116 at a distal end of the handle 112 opposite the joint 114.

Where the steering mechanism 110 is connected with the front portion 105 of the wagon 100, the pivoting of the handle 112 can be enabled between a pulling mode of the wagon 100, where the handgrip 116 extends forward from the steering column and front portion 105 of the chassis, as shown in FIG. 2A, and a driving mode of the wagon where the at least one handgrip 116 extends rearward from the steering column toward the at least one bucket of the chassis, as shown in FIG. 2B. Where the steering mechanism 110 is connected with the rear portion 103 of the wagon 100, as shown in FIG. 2C, the handle 112 will predominately be positioned in a "push" mode to enable a person external the wagon 100 to push, propel and steer the wagon.

The wagon 100 can further include a braking mechanism 118 having at least one brake associated with at least one of the at least one of the one or more front wheels and/or one or more rear wheels. The braking mechanism 118 can further include a braking actuator configured to actuate the at least one brake for braking the at least one of the one or more front wheels and/or one or more rear wheels. The braking actuator being accessible from the at least one bucket in the driving mode, such as by a pedal, a button, a switch, a shifter, or the like. Alternatively, the braking actuator can be positioned on the handle 112 on or near the handgrip 116.

In some preferred exemplary implementations, the wagon 100 includes three or four wheels and a chassis or frame. An implementation using four wheels can include two front wheels and two rear wheels. The front wheels 104 can be mounted to the chassis or frame as casters, which operate between a locked or rack-and-pinion mode in which the front wheels are locked in a fixed position but engaged with a rack-and-pinion steering mechanism, and an unlocked or free-steering mode in which the front wheels 104 are freely-rotating casters. The rear wheels 102 can be fixed together by an axle, or can be independently mounted to the chassis 106 or frame.

In alternative implementations, a wagon includes three wheels, with either one front wheel and two rear wheels, or two front wheels and one rear wheel. The chassis or frame can be formed of rigid tubing, struts or bars, or the like. These can be formed of a metal, an alloy, or a synthetic material such as nylon, or carbon fiber.

Figure 3B:
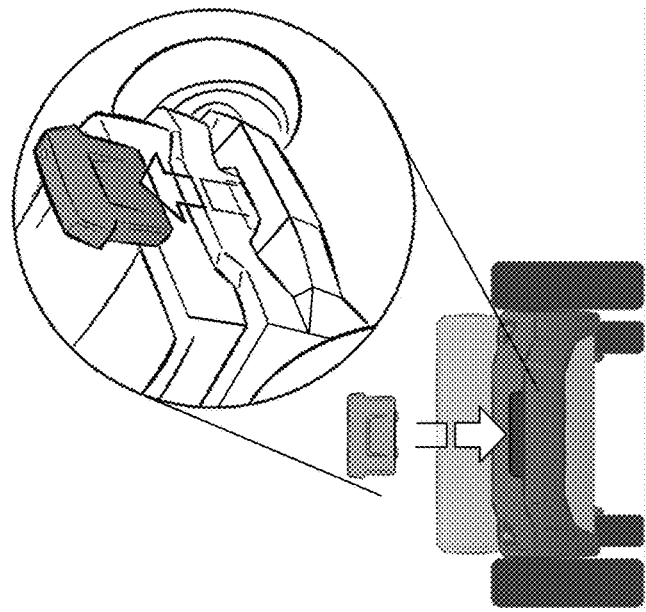
FIGS. 3A-3C depict additional features and designs for an electric utility and play wagon in accordance with implementations described herein.
Figure 3A:
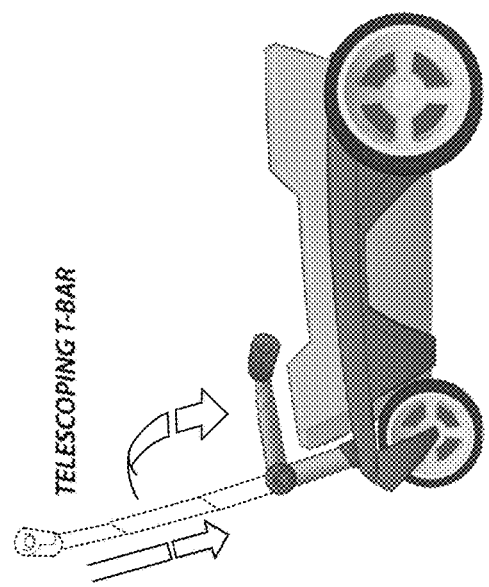
Figure 3C:
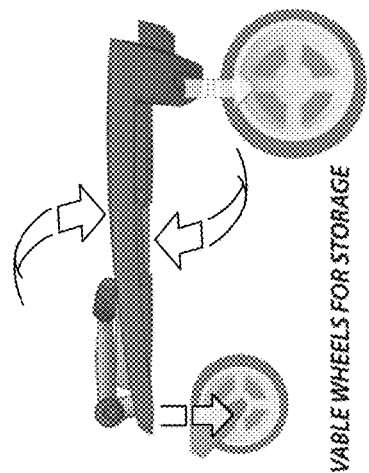

In some implementations, the rear wheels 102 and/or front wheels 104 include an electric motor for motion assist. The electric motor can be a single motor connected to both rear wheels, or each of the two rear wheels can have its own electric motor. The electric motor can be powered by a battery connected on the chassis or frame, as shown in FIG. 3B. The battery can be fixed and rechargeable via an electrical connection, or removable and replaceable by a charged battery, and explained in further detail below. Each of the front wheels and/or rear wheels can be removable and replaceable to accommodate various types of terrains—concrete, sand, snow, and off-road, as shown in FIG. 3C. For instance, narrow rubber wheels work great on concrete, oversized inflatables are preferable for sand, while knobby tires easily handle snow and off-road. A quick-release mechanism on or near the wheel makes swapping wheels seamless and easy. In some implementations, the wheels can fold in or under the chassis or frame.

The wagon can include one or more shock absorbers, such as coupled between the wheels and the chassis or frame. The shock absorbers can include a spring, a leaf spring, a hydraulic shock absorber, an elastomer, or other type of shock absorber. The shock absorbers may have one or more settings or comfort levels, and can be adjustable to make a ride more or less rigid based on user preferences. In some implementations, the settings of the shock absorbers can be controlled electronically, via a control system on the wagon, or via an application running on a computing device in communication with the wagon. As described herein, and shown in FIG. 1, the wagon 100 can include a front-mounted, multi-functional handle ("front handle") that can extend forward to be pulled from the front, or pivoted backward to allow an occupant of the wagon to steer the wagon. In some implementations, the front handle includes a joint around which the front handle can pivot between two or more locked positions, and the joint can be locked by a releasable locking mechanism that can be released by a button, switch, latch, or the like. The front handle can also include a telescoping member above the joint to allow the front handle to extend between a retracted position to an extended position, and to any number of positions or lengths therebetween, as shown in FIG. 3A.

The front handle is preferably a T-bar, i.e. has a cross bar at a distal end of the front handle, as shown in FIG. 1. The cross bar can include opposing hand grips or handles, each of which in turn can include one or more of a brake or brake actuator (such as a handbrake), throttle, clutch, horn, switches, buttons, and mirrors, which can operate and control features such as the electric motor of the rear wheels, lights such as light emitting diodes (LEDs) mounted on the wagon, one or more speakers for producing sound effects or music, or other features such as geo-fencing or geo-location, sensors such as a motion sensor, a speed sensor, an accelerometer, weight sensor, or the like.

The brake(s) of a braking system can be connected with or applied to one or more of the front wheels and/or one or more of the rear wheels, in the form of a disk brake, a drum brake, or the like. The braking system can be configured with a locked mode, in which a brake of the braking system is activated and applied to at least one of the front wheels and/or the rear wheels, so as to inhibit the wagon from rolling or moving while in the locked mode. Further, the braking system can be configured with an unlocked mode, in which none of the wheels are locked with a brake, except as applied by a user or occupant of the wagon, using a handbrake on a front or rear handle, or a footbrake within the wagon.

The wagon can also include a rear handle, which can preferably be in the form of an insertable bar or shopping cart-like cross-handle, but which can also telescope or otherwise extend up and rearward from the chassis or frame. In some implementations, the rear handle can only be engaged when the front handle is pivoted rearward and/or retracted.

The wagon can include a front wall, a rear wall, and opposing sidewalls to form a main cargo portion to carry gear, objects, or people. The main cargo portion can further include a lower bucket that can accommodate the feet of an occupant of the main cargo portion. The lower bucket can be narrower than the main cargo portion, and can have an under-mounted liner or member to be able to receive blunt force from outside objects such as curbs, parking stops, rocks, or the like. In some implementations, the main cargo portion can be formed to be water-tight, so as to be able to float in water. The wagon can be configured so as a center of gravity of buoyancy is at the bottom of the main cargo portion, to keep the wagon upright when in water.

The frame and/or walls that define the main cargo portion and/or bucket can be collapsible or foldable to allow the wagon the be collapsed into a compact shape for easy storage. The lower bucket can "accordion" up or down depending on what will be placed into the main cargo portion of the wagon. Alternatively, the frame and/or main cargo portion can compress inward or extend outwardly sideways, to adjust the width of the wagon. For instance, the lower bucket can be formed to receive the feet of one child (FIGS. 2B and 2C), or two children sitting in the main cargo portion face-to-face (FIG. 4C), or tandemly in the same direction. The main cargo portion can include one or more removable or folding seats. In some implementations, the seats can be designed to resemble seats of a high-performance vehicle or jet. The seats preferably include a seatbelt, and which can be a three-point harness.

The wagon can include a folding mechanism to allow for "one-hold folding" whereby a single person can operate an actuator and have the wagon fold in on itself, for compactness and/or storage, as shown in FIG. 3C. The actuator can operate any number of locking mechanisms that keep the wagon in its unfolded state The wagon can further include removable, customized side wall liners or "skins" that provide for various options of the external "look" or design of the wagon, as illustrated in FIGS. 4A and 4B, as well as FIG. 4E. The skins can be attached to an outer portion of the frame or an inner portion of the frame, and can be attached by snaps, hook-and-loop attachments, buttons, latches, magnets, screws, clips, clasps, or the like. Other exterior features can allow customization of the form factor of the wagon, to the form of a car, a truck, a plane, a helicopter, a tank, a sleigh, a boat, a sled, etc., or any other vehicle. The exterior features can also allow the wagon to be in a form factor of an animal, such as a lion, an elephant, a zebra, a dinosaur, or the like. Further still, the exterior features can be based on, and made to resemble, a movie character, a popular toy, or the like. The skins and/or exterior features can be made of any rigid or semi-rigid material, such as plastic, polycarbonate, polyvinyl acetate, polyvinyl carbonate, aluminum, stainless steel, nylon, particle board, or the like.

In some implementations, the wagon can include LEDs mounted on the rear and/or front of the wagon, for both lighting an area behind and/or in front of the wagon, respectively. Further, LEDs can be placed anywhere on the wagon for design purposes, such as for providing a glowing effect for an engine afterburner, for example, or for indicating a state or mode of the wagon to an occupant. For instance, the main cargo portion can include a dashboard or control panel, with a digital or graphical user interface. The interface can include one or more of LEDs, a touch-sensitive display, a capacitive display, or the like.

As discussed above, the wagon can also include one or more speakers for providing music or sound effects, or through which to communicate with a remote person or device such as through, for example, a cellular radio, a short-range wireless connection such as Bluetooth, or other type of radio frequency communication channel. The wagon can also be operated in part through an application running on a computing device, such as a smart phone, tablet computer, or the like. The application can be configured to control lighting schemes, sound generation, or even speed governance.

In some implementations, the computing device running the application can be initially "paired" with a wagon, and the pairing can be registered in a database so as to allow the computing device and/or application to act as a "key" for operating the wagon. For example, unless the wagon is in close proximity to the computing device, the wagon may lock up one or more wheels, and render it inoperable. In another example, the one or more wheels can remain locked unless and until unlocked by the application with user input. Each wagon may have its own identifier, or other unique code or number, which can be used for lifecycle management, tracking, or even enablement of new features, which can in turn be based on user information associated with a user of the application. The application can also generate a user interface for a game associated with the wagon. For example, if a skin or external feature represents the wagon as an airplane, the application can be configured to generate various aviation-oriented controls such as an altimeter, gimbals, airspeed gauge, or other flight controls and/or dials. In another example, if the wagon is configured as a racecar, the application can generate a map of a speedway based on a true map of a local area proximate the wagon. In yet another example, when in utility mode to haul around a cooler or ice chest for food for the beach, the application can display relevant information local to the beach, such as where to buy ice, food, drinks, etc.

As shown in FIG. 1 and FIGS. 2A-2C, respectively, the wagon can have a pull mode and a push mode. In the pull mode, the front handle extends forward to allow a user to pull the wagon. In the pull mode, the front handle may or may not need to be fully telescoped out, and may or may not be locked into a single forward position, but rather may be pivotable between two pre-set positions. In the push mode, the front handle pivots rearward and the rear handle is deployed, either as an insertable handle bar, or as a telescoping or folding-up handle bar, to allow the user to push the wagon from behind.

As discussed above, the wagon can have a utility mode and a driving mode. In the utility mode, the front handle is pivoted and/or telescoped forward, and the front handle can be locked against side-to-side movement. In the utility mode, the front wheels are free-moving so as to follow the lead or direction of a user pulling the wagon. In the driving mode, the front handle is pivoted backward, toward an occupant of the wagon, and a rack-and-pinion steering system is engaged, to allow the occupant to steer the wagon while sitting inside. Various controls can be used such that the driving mode is not enabled if the occupant is standing or otherwise not sitting or strapped in to their seat. Alternatively, the front handle can turn the front wheels regardless of whether the wagon is in the utility mode or driving mode, where the front wheels are connected by an axle, which in turn is rotatably coupled to the chassis or frame.

The battery to power the motor, lighting, speakers, display (s), and or other electronic-driven devices, is preferably a rechargeable battery. The wagon can include a slot or compartment in which the battery is easily placed and secured, and connected to battery electrical contacts for powering the aforementioned devices. In some implementations, the battery is rechargeable via a charging connection integrated with the wagon, such as an electrical port to be connected with an electrical outlet of a structure, for example, or via an induction charging device. Alternatively, the battery is removable and replaceable by another charged battery, when necessary. In some implementations, the wagon can include one or more auxiliary slots for storing auxiliary batteries, for use when a main battery runs low on charge. Further still, two or more batteries can be connected with the wagon, and a switch can be employed to switch between a discharged battery and a charged battery. A display of at least a set of LEDs, or a graphical display on the wagon or provided by an application on a computing device, for example, can provide an indication of a charge amount remaining on a battery in use, as well as any auxiliary battery.

In some implementations, the wagon can include a canopy or cover. The canopy or cover can be fixed, or deployable (i.e. can be extended out over the main cargo portion and retractable from the main cargo portion into a stored position). The canopy can include one or more support structures to support a cover. The canopy or cover can be rigid or flexible, such as a cloth material. A rigid canopy or cover can be removable so as to be stored separate from the wagon or when not in use. The support structures can be formed of linear struts, or curved loops, and can be made of metal, plastic, bamboo, or the like. In some implementations, the canopy or cover can be formed of a unitary piece that includes the support structures, which in turn can have connections for connecting to the wagon.

Although a few embodiments have been described in detail above, other modifications are possible. Other embodiments may be within the scope of the following claims.

The invention claimed is:

1. A wagon configured to convey at least one object, the at least one object being an inanimate object and/or a living being, the wagon comprising:
   a chassis having a front portion, a rear portion and opposing side portions, the chassis further including at least one bucket that is sized and configured to contain the at least one object;
   a pair of front wheels connected with the front portion of the chassis, the pair of front wheels each including a caster and being connectable with a rack-and-pinion system, the pair of front wheels being switchable between a free-moving caster mode and a locked rack-and-pinion mode;
   at least one rear wheel connected with the rear portion of the chassis;
   a propulsion mechanism engaged with at least one of the front wheels and/or one of the at least one rear wheel;
   a steering mechanism connected with the front portion of the chassis to enable steering of the wagon, the steering mechanism comprising a handle connected with the steering column by a joint that enables a pivoting of the handle, at least one handgrip at a distal end of the handle opposite the joint, and a steering column, the pivoting of the handle being enabled between a pulling mode of the wagon where the at least one handgrip extends forward from the steering column and front portion of the chassis to disengage the steering column from the pair of front wheels to enable the free-moving caster mode, and a driving mode of the wagon where the at least one handgrip extends rearward from the steering column toward the at least one bucket of the chassis to engage the steering column with the rack-and-pinion system to enable the locked rack-and-pinion mode; and
   a drive actuator configured to actuate the propulsion mechanism to drive the pair of front wheels and/or the at least one rear wheel, the drive actuator being accessible from the at least one bucket in the driving mode.

2. The wagon in accordance with claim 1, further comprising:
   a braking mechanism comprising at least one brake associated with at least one of the pair of front wheels and/or the at least one rear wheel; and
   a braking actuator configured to actuate the at least one brake for braking the pair of front wheels and/or the at least one rear wheel, the braking actuator being accessible from the at least one bucket in the driving mode.

3. The wagon in accordance with claim 1, wherein the propulsion mechanism includes an electric drive motor.

4. The wagon in accordance with claim 3, further comprising a removable battery configured to power the electric drive motor.

5. The wagon in accordance with claim 1, wherein the propulsion mechanism includes a manual propulsion mechanism operable by the living being when the at least one object being conveyed by the wagon is the living being.

6. The wagon in accordance with claim 1, wherein the handle includes a first portion that telescopes from a second portion to extend a length of the handle.

7. A wagon configured to convey at least one object, the at least one object being an inanimate object and/or a living being, the wagon comprising:
   a chassis having a front portion, a rear portion and opposing side portions, the chassis further including at least one bucket that is sized and configured to contain the at least one object;
   a pair of front wheels connected with the front portion of the chassis, the pair of front wheels each including a caster and being connectable with a rack-and-pinion system, the pair of front wheels being switchable between a free-moving caster mode and a locked rack-and-pinion mode;
   at least one rear wheel connected with the rear portion of the chassis;
   a propulsion mechanism engaged with at least one of the front wheels and/or one of the at least one rear wheel;
   a steering mechanism connected with the front portion of the chassis to enable steering of the wagon, the steering mechanism comprising a handle connected with the steering column by a joint that enables a pivoting of the handle, at least one handgrip at a distal end of the handle opposite the joint, and a steering column, the pivoting of the handle enabling switching between a pulling mode of the wagon where the at least one handgrip extends forward from the steering column and front portion of the chassis to disengage the steering column from the pair of front wheels to enable the free-moving caster mode, and a driving mode of the wagon where the at least one handgrip extends rearward from the steering column toward the at least one bucket of the chassis to engage the steering column with the rack-and-pinion system to enable the locked rack-and-pinion mode; and
   a drive actuator configured to actuate the propulsion mechanism to drive the pair of front wheels and/or the at least one rear wheel, the drive actuator being accessible from the at least one bucket in the driving mode and from the handgrip in the pulling mode.

8. The wagon in accordance with claim 7, wherein the propulsion mechanism includes an electric drive motor.

9. The wagon in accordance with claim 8, further comprising a removable battery configured to power the electric drive motor.

10. The wagon in accordance with claim 7, wherein the propulsion mechanism includes a manual propulsion mechanism operable by the living being when the at least one object being conveyed by the wagon is the living being.

\* \* \* \* \*